United States Patent [19]
Wood et al.

[11] 4,343,819
[45] Aug. 10, 1982

[54] QUICK-DISSOLVING POWDERED DRINK AND METHOD THEREFORE

[75] Inventors: Robert W. Wood, West Milford, N.J.; Andrew C. Hoefler, Warwick; Deborah S. Brody, Kew Gardens Hills, both of N.Y.

[73] Assignee: General Foods Corporation, White Plains, N.Y.

[21] Appl. No.: 278,280

[22] Filed: Jun. 29, 1981

[51] Int. Cl.³ ............................. A23L 2/38; A23L 2/40
[52] U.S. Cl. ........................................ 426/96; 426/99; 426/289; 426/293; 426/285; 426/590; 426/591; 127/30; 127/63
[58] Field of Search .................. 426/96, 99, 289, 293, 426/285, 590, 591; 127/30, 63

[56] References Cited
U.S. PATENT DOCUMENTS

| | | | |
|---|---|---|---|
| 2,807,559 | 9/1957 | Steiner | 127/30 |
| 2,868,646 | 1/1959 | Schapiro | 426/590 X |
| 2,889,226 | 6/1959 | Hinkley | 426/591 X |
| 2,953,459 | 9/1960 | Diller | 426/591 |
| 3,136,692 | 6/1964 | Bandelin | 426/591 X |
| 3,619,293 | 11/1971 | Niimi | 127/30 |
| 3,930,053 | 12/1975 | Japikse et al. | 426/590 |
| 3,983,251 | 9/1976 | Singh | 426/329 |

Primary Examiner—Joseph M. Golian
Attorney, Agent, or Firm—Thomas R. Savoie; Daniel J. Donovan

[57] ABSTRACT

A quick-dissolving, sucrose and acid-containing drink mix is prepared by binding particles of a water-soluble carbonate onto the surface of sucrose granules such that the $CO_2$-generation which occurs when the mix is dissolved in water promotes rapid dissolution of the sucrose. The level of $CO_2$-generator is insufficient to produce a carbonated beverage and desirably an antifoam agent is included in the mix.

10 Claims, No Drawings

QUICK-DISSOLVING POWDERED DRINK AND METHOD THEREFORE

TECHNICAL FIELD

This invention relates to a powdered, sugar-containing drink mix which will rapidly dissolve in cold water, with a minimum of stirring or agitation. Such a mix would be desirable not only for household preparation of beverages from powdered soft drink mixes but also would be particularly beneficial to the food service industry. Quite often fast-food restaurants and cafeterias utilize refrigerated dispensers, such as Jet-Spray ® coolers for holding and dispensing non-carbonated beverages such as fruit punch, orange drink, etc. These dispensing units provide only slight agitation of the liquid which is sufficient to maintain a homogenous solution but which is not sufficient to effect rapid solution of a powdered drink mix which is put directly into the unit. To overcome this problem, food service operations must pre-dissolve the powder in a separate container, using vigorous agitation and/or hot water prior to addition to the dispensing unit. It would be desirable to provide a powdered mix which would be as convenient and quick to dilute as syrup.

BACKGROUND ART

Among the prior practices in the art of producing rapidly-dissolving, powdered drink mixes, there have been numerous attempts to convert sucrose, usually the major ingredient of these mixes, into a physical form which is more rapidly soluble than conventional sucrose crystals. An example of these techniques is U.S. Pat. No. 3,619,293 to Numi. It is also known in the beverage art to apply this technique to a total beverage mix wherein, as described in U.S. Pat. No. 3,936,053 to Japilise et al, both sugar and flavor base are jointly combined into a physical form which is rapidly soluble.

Unfortunately any of the aforementioned prior art techniques include the use of specialized crystallization and/or drying techniques. It has not heretofore been possible to produce a rapidly dissolving beverage mix utilizing common food ingredients and simple mixing steps which are familiar and available to the average manufacturer of powdered beverage mixes.

DISCLOSURE OF INVENTION

A quick-dissolving, sugar containing powdered drink mix, suitable for preparing a non-carbonated beverage, is prepared by binding a carbon dioxide ($CO_2$) generator onto the surface of sucrose granules using a non-aqueous, food-grade binding agent. Desirably an antifoam agent is also included in the mix in order to minimize any foam problem arising due to evolution of $CO_2$ from the $CO_2$-generator.

According to this invention the sugar component of the drink mix is coated with a non-aqueous binding agent selected from the group consisting of edible polyhydric alcohols, fluid mono-, di-, and triglycerides and mixtures of any of these. The purpose of the binding agent is to permit a $CO_2$-generator to be bound onto the surface of the sucrose. In this manner $CO_2$-generation takes place in close proximity to the sucrose granules and maximum effect towards aiding the sucrose granules to dissolve is achieved. As will be recognized by those skilled in the art, sucrose which usually constitutes over 60% by weight of the drink mix is the limiting factor in obtaining rapid dissolution.

Non-aqueous binding agents are required for use with the water-soluble $CO_2$-generating agents employed in this invention. Were water to be present in the binding agent, a separate low-temperature drying step would be required before the acid component could be added and come into contact with the $CO_2$-generator. Drying would be necessary as the generator will react with the acid in the presence of water, thereby releasing $CO_2$. If drying is attempted this would have to be done at a low temperature (less than about 100° C.) in order to avoid decomposing or degrading the carbonating agent. As will be appreciated by those skilled in the art, low-temperature drying is inefficient from the standpoint of time, cost and energy.

The preferred polyhydric alcohol binding agent is propylene glycol. In typical beverage mixes the polyhydric alcohol will be utilized at a level of from about 300 to 500 ppm by weight of the mix. Amounts in excess of 5,000 ppm would be usable provided adverse flavor effects are not produced and excess caking does not result, but levels in excess of 5000 ppm are usually not necessary.

Among the glyceride binding agents that may be employed are triglycerides, such as vegetable oils and surface-active mono- and diglycerides. In typical beverage mixes a triglyceride would be utilized at a level of from about 30 to 60 ppm. Surface active mono- and diglycerides could be used at a level of from 100 to 3000 ppm. These surface active glycerides, such as acetylated monoglycerides, function not only as binding agents but also act as wetting agents thereby further aiding dissolution of the sucrose granules when the beverage mix is reconstituted. For this latter purpose, other known wetting agents, such as polysorbates (e.g., sorbitan mono-oleate polyoxyethylene), may be used in addition to effective levels of binding agents.

The binding agent may be either sprayed onto the surface of the sucrose or blended with the sucrose either before or during the time the $CO_2$-generator is blended with other sugar. For mixing purposes, as shown in the Example, a premix of the binding agents with a small (less than 10%) proportion of the total sucrose may be made initially and then this premix combined with the remainder of the sugar.

The $CO_2$-generators useful in this invention are the edible, water-soluble carbonate materials capable of reacting with an acidulating agent to effect the release of carbon dioxide upon contact with water. In particular are the inorganic carbonates including sodium carbonate, sodium bicarbonate, sodium sesquicarbonate, potassium carbonate, potassium bicarbonate, calcium carbonate, ammonium carbonates, double salts (e.g. dolmite, Engel salts, etc.); these may be used alone or in combination. In order to minimize adverse flavor impact it may be preferred to use two or more carbonates, each having a different cation.

In order to obtain an effective distribution of the $CO_2$-generator throughout the large mass of sugar granules it is necessary that the generator particles have a size significantly less than that of the sugar granules. According to a preferred embodiment of this invention the sugar granules are sized such that at least 50% (weight basis), most preferably at least 70%, of the sugar has a particle size which will be retained on a 200 mesh USS sieve (about 74 microns). The particles of the $CO_2$-generator are sized such that the average particle size (weight-basis) is less than 60 microns and preferably falls within the range between about 6 and 30 microns. Usually the average particle size of the $CO_2$-generator particle will be less than one-half that of the sucrose particles.

The amount of $CO_2$-generator utilized must be great enough to significantly increase the rate at which the sucrose dissolves. Typically this will require generator in the amount of at least 1%, preferably at least 2%, by weight of the sucrose. The level of $CO_2$-generator contained in the powdered drink mix of this invention is however insufficient to produce a carbonated beverage, and will typically be less than about 6% by weight of the sucrose. In the case where the $CO_2$-generator is one or more carbonates, the carbonates will be present at a level of less than 50%, preferably less than 40%, by weight of the acidulent contained in the powdered drink mix.

Due to the presence of the $CO_2$-generator, any tendency of the drink mix to produce foam upon disssolution is increased. As this is usually considered to be undesirable, the addition of an antifoam additive to the composition of this invention is desirable. Edible silicone antifoam agents are preferred and these will typically be used at a level of from about 20–200 ppm based on the weight of the dry mix. As used herein, silicone means polysiloxanes or organopolysiloxanes of various types which are commercially-available and known to be useful as edible antifoaming agents.

Other ingredients normally used in powdered soft drink mixes can be contained in the formulation of this invention. Acidulating agents such as citric, fumaric, tartaric, malic and lactic acids either singly or in combination will typically be included at a level of from 5 to 20% by weight. Buffering salts such as the alkali metal and alkaline earth metal phosphates, citrates, acetates etc. will be used at a low level, usually less than about 1% by weight of the mix. Other functional ingredients such as clouding agents, colors, dyes, vitamins, flavors, etc. may also be included.

This invention is further described but not limited by the following example.

EXAMPLE

| Ingredient | Weight % |
|---|---|
| Sucrose (100% minus 70 mesh, 70% plus 200 mesh) | 85.9504 |
| Citric Acid | 8.9859 |
| $CaCO_3$ (0.5 to 80 microns) | 1.2841 |
| $NaHCO_3$ (0.5 to 80 microns) | 1.2841 |
| Fixed flavors | 0.8724 |
| Trisodium Citrate (buffer) | 0.5209 |
| $KHCO_3$ (0.5 to 80 microns) | 0.4154 |
| Clouding Agent | 0.2974 |
| Propylene Glycol | 0.2396 |
| Acetylated Monoglyceride (Myvacet ® 9–45, a product of Eastman Kodak, Inc) | 0.1068 |
| Vitamin C | 0.0407 |
| Color | 0.0013 |
| Dimethyl Polysiloxane (10% emulsion) | 0.0010 |

A 3400 lb batch of the above powdered drink mix was prepared by placing 2823.72 lbs of sucrose in a ribbon blender and adding thereto 110.39 lbs of a sugar premix which was formed by blending 98.61 lbs of sugar, 8.15 lbs of propylene glycol (polyhydric alcohol binder) and 3.63 lbs of Myvacet ® 9–45. The premix was formed in order to facilitate distribution of the binding agent throughout the sucrose component. The average particle size of the sucrose component was about 110 microns. Mixing was continued for six minutes and thereafter 101.44 lbs of a carbonate premix (average particle size about 30 microns) containing 43.66 lbs $CaCO_3$, 43.66 lbs of $NaHCO_3$ and 14.12 lbs of $KHCO_3$ was added. Mixing was continued for two minutes and thereafter a premix containing 305.52 lbs of citric acid, 29.66 lbs of the flavor, 10.11 lbs of clouding agent, 1.38 lbs of vitamin C, 0.04 lbs of color, 17.71 lbs of trisodium citrate and 0.03 lbs of silicone emulsion was added and mixed for eight minutes.

The drink mix of this Example was compared to a control formulation which did not contain the binding, carbonating and antifoam agents of the example. The rate of comparitive dissolution was measured by adding 100 grams of the dry mix to 1 liter of water (65° F.) contained in an Imhoff settling cone. Two minutes after the mix was added to the cone (no agitation) the amount of undissolved solids collected at the bottom of the cone was read from the graduated markings located on the cone. The control sample had approximately 6 mls. of undissolved matter while the Example has approximately 1 ml. of undissolved matter.

Having thus described the invention, what is claimed is:

1. A quick-dissolving, sugar-containing powdered drink mix comprised of at least 60% by weight sucrose, an edible acidulent and a dry, particulate $CO_2$-generator, wherein the $CO_2$-generator has an average particle size less than one-half that of the sucrose particles and is bound to the surface of the sucrose particles by means of a non-aqueous binding agent selected from the group consisting of polyhydric alcohols, vegetable oils, fluid monoglycerides, fluid diglycerides and combinations thereof and wherein the amount of $CO_2$-generator is insufficient and to produce a carbonated beverage, and is in the range of 1% and less than 6% by weight of the sugar.

2. The powdered drink mix of claim 1 which includes from 20 to 200 ppm of an antifoam agent.

3. The powdered drink mix of claim 2 wherein the antifoam agent is a silicone.

4. The powdered drink mix of claim 1 or 2 wherein the $CO_2$-generator consists of one or more carbonate salts.

5. The powdered drink mix of claim 1 or 2 wherein the binding agent comprises a polyhydric alcohol present at a level of from about 300 to 5000 ppm by weight of the mix.

6. The powdered drink mix of claim 5 wherein the polyhydric alcohol is propylene glycol.

7. A method of making a quick-dissolving, sugar-containing drink mix comprised of at least 60% by weight sucrose, an edible acidulent and a dry, particulate $CO_2$ generator, wherein the $CO_2$-generator has an average particle size less than one-half that of the sucrose particles and is bound to the surface of the sucrose particles by means of a non-aqueous binding agent selected from the group consisting of polyhydric alcohols, vegetable oils, fluid monoglycerides, fluid diglycerides and combinations thereof and wherein the amount of $CO_2$-generator is insufficient to produce a carbonated beverage and is in the range of 1% and less than 6% by weight of the sugar comprising:

(a) coating the sucrose particles with a non-aqueous binding agent, (b) blending particles of a $CO_2$-generator with the coated sucrose, and thereafter, (c) blending an acidulent with the blend of step b.

8. The method according to claim 7 wherein an antifoam agent is added to the drink mix at a level of from 20 to 200 ppm.

9. The method according to claim 7 or 8 wherein the non-aqueous binding agent combined with a minor fraction of the sucrose and thereafter this combination is blended with the remainder of the surcrose.

10. The method according to claims 7 or 8 wherein the binding agent comprises a polyhydric alcohol at a level of from about 300 to 5000 ppm by weight of the mix.

* * * * *